United States Patent [19]
Letemps et al.

[11] Patent Number: 5,226,942
[45] Date of Patent: Jul. 13, 1993

[54] METHOD OF AND DEVICE FOR CURVING GLASS SHEETS

[75] Inventors: Bernard Letemps, Thourotte; Jacques Leclercq, Roisel; Philippe Dereims, Compiegne, all of France

[73] Assignee: Saint-Gobain Vitrage International, Courbevoie, France

[21] Appl. No.: 810,900

[22] Filed: Dec. 20, 1991

[30] Foreign Application Priority Data

Dec. 21, 1990 [FR] France .................... 90 16177

[51] Int. Cl.⁵ .......................... C03B 23/023
[52] U.S. Cl. .......................... 65/106; 65/107; 65/158; 65/287; 65/323
[58] Field of Search ............. 65/29, 106, 107, 158, 65/160, 273, 287, 323

[56] References Cited

U.S. PATENT DOCUMENTS

| | | | |
|---|---|---|---|
| 4,364,766 | 12/1982 | Nitschke | 65/160 |
| 4,753,668 | 6/1988 | Honjo et al. | 65/29 |
| 4,838,920 | 6/1989 | Blasquez-Gonzales | 65/160 |
| 4,985,059 | 1/1991 | Letemps et al. | 65/158 |

*Primary Examiner*—Joye L. Woodard
*Attorney, Agent, or Firm*—Oblon, Spivak, McClelland, Maier & Neustadt

[57] ABSTRACT

A method of and device for curving a glass sheet, in which the glass sheet is brought through a reheating furnace by a conveyor defining a substantially horizontal transportation plane, and is then taken over by a tool, by means of which the glass sheet is curved and/or transferred to a curving and/or discharge device. The effective position of the glass sheet is detected and the taking-over tool is repositioned as a function of the effective position.

16 Claims, 3 Drawing Sheets

METHOD OF AND DEVICE FOR CURVING GLASS SHEETS

BACKGROUND OF THE INVENTION

1. Field of the Invention

This invention relates to the techniques of curving glass sheets, in which the glass sheets are brought to the curving tools or molds by a conveyor which defines a substantially horizontal transportation plane for the glass, on which the glass sheets travel one after another, heated above their softening temperature. More specifically, the invention concerns the problem of positioning the glass sheets with respect to the tools such as the curving molds. The invention can be applied, for example, to the industrial manufacture of automobile glazings.

2. Description of the Related Art

The proper control of the quality of the output from a production line for curving glass sheets requires that it shall be possible to guarantee that each glass sheet is correctly positioned relative to the curving tool at the instant at which the latter takes the sheet over. This operation is fairly easy to achieve when it is performed cold, which is the case, for instance, for the majority of curving lines intended for producing laminated glazing panes, in which from the time of entry into the furnace the glass sheets are placed on their curving frame by settlement into position. In these cases, the referencing is typically achieved by sets of stops mounted on the curving tools. Much more strict precautions must, however, be taken when this taking-over is performed with a glass sheet that has already been reheated to its curving temperature and possibly toughening temperature, and therefore at a time at which its plasticity and consequently its sensitivity to shocks and friction are at the maximum.

When cold, on entering the reheating furnace, the glass sheet is charged onto the substantially horizontal conveyor in accordance with a very precise position. But its path along this conveyor, which is generally composed of a bed of rollers, is somewhat uncertain at least in consideration of the fact that in the most difficult cases, for example, an accuracy of positioning of the glass sheet of the order of one-tenth of a millimeter may be required. The discrepancies in trajectory may be analysed into slidings perpendicular to the axis of the conveyor and rotations about this axis.

It is possible to remedy perpendicular sliding by means of straight-edges or lateral stops moving in synchronism with the movement of the glass sheets; an example of such a system of lateral positioning is described in European Patent Application EP-A-367 670. These systems can operate very gradually and gently, and for this reason do not leave any imprint on the final plane. But these systems do result in wear of the roller facings. Moreover, in roller furnaces, it is generally found that the glass sheet maintains the lateral position acquired from the instant at which its temperature exceeds the softening point of the glass, which generally occurs at latest after it has completed two-thirds of its travel through the furnace.

In contrast, angular positioning systems are much less satisfactory, even though it has been possible to make considerable improvements to them in the past. In fact, the problem does not really reside in the systems themselves, but in the fact that the tendency to an axial deviation persists very late, virtually up to the taking-over by the shaping tool. This tendency can be explained, notably, by slipping on the rollers, which cannot be entirely eliminated, because it is absolutely imperative to prevent the rollers from marking the glass sheet in a permanent manner.

To minimize the consequences of these angular deviations, it is therefore imperative to perform the corresponding centering virtually at the same instant as taking-over, which is a nuisance from several aspects. The first reason is that the operation takes place at the instant at which, as indicated above, the sensitivity to marking of the glass is at its maximum; now by definition the centering of a glass sheet requires that it shall be acted upon and touched. Systems are indeed known which tend to eliminate the harmful consequences of this contact, for example systems which do not stop the glass sheet but only slow it down (EP-A-389 316) or which retract again as rapidly as possible (EP-A-389 317). But the expense of these systems frequently becomes higher the more efficient they are and in any case their sophistication increases the risks of incorrect functioning.

The second point is that all these systems are to some extent self-regulating or, more precisely, they act upon the glass sheet in a manner and/or for a period which depend upon the position of the sheet when it enters their field of action. The operator in charge of monitoring the production line has no means of estimating if this action has been performed deliberately. He will, most certainly, when this is not the case find out that the panes produced are not entirely in conformity with the requirements established but this non-conformity may possibly be explained by other reasons, such as incorrect setting of the pressing frame, for example, or more generally of the curving machine, with the result that there is a risk of not immediately identifying the source of the problems and of upsetting everything by a series of inappropriate actions.

Another harmful aspect of late centering is that, in a certain number of cases, the taking-over zone is already largely encumbered by the relevant tools and other devices; moreover, centering systems must be retracted, for example to enable the glass sheet to be pressed, and this again increases the number of possible sources of problems. Finally, since the positioning system stops or at least slows down the glass sheet, it leads to an increase in cycle times, which runs contrary to the objective of high output rates, particularly for relatively simple products.

SUMMARY OF THE INVENTION

The present inventors have chosen to circumvent this problem of angular positioning to a great extent by renouncing extreme accuracy at this level. They propose to curve a glass sheet by bringing it through a heating furnace by a conveyor which defines a substantially horizontal transportation plane and then by having it taken over by a tool, by means of which it is curved and/or transferred to a curving and/or discharge device, the invention including in the detection of the effective position of the glass sheet and the repositioning of the taking-over tool as a function of this effective position. The detection may consist of measuring the angle $\alpha$ of difference between the effective direction followed by the glass sheet before it is taken over and the longitudinal axis of the conveyor and in rotating said taking-over tool through this angle $\alpha$ so as to center it exactly on the effective position of the glass sheet. This detection may also consist in measuring the transverse offset, relative to the longitudinal axis of the associated furnace, and in translating the taking-over tool in a manner corresponding to this transverse offset. Depending upon the case, the repositioning of the taking-over tool will therefore be of the rotation and/or translation type.

The point of view is, therefore, entirely reversed here and it is no longer the glass sheets which are centered relative to the curving machine, but it is this curving machine which is repositioned appropriately for each glass sheet. By definition, this process is entirely harmless for the glass sheets, which are left free in their movements in the transportation plane. Furthermore, the accuracy of the centering may be improved, because the initial position of the taking-over tool is known with great exactness, either because the preceding position was memorized or more simply because the taking-over tool is replaced between two successive glass bodies to a reference position corresponding, for example, to a perfect alignment. Furthermore, this taking-over tool may certainly have a position which is mechanically and possibly very rapidly servo-controlled.

To leave the glass sheet entirely free in its movements in the transporting plane of the conveyor does not signify absence of any measure intended for controlling its position; the invention does not exclude, notably, a correct positioning during charging into the furnace and lateral centering within the furnace. If necessary, a frontal centering may also be performed, but solely within the first part of the reheating furnace, that is to say at a time at which the centering cannot yet lead to marking of the glass. In the last part of the furnace, the glass sheet travels freely and can deviate from its trajectory by an angle $\alpha$, which can be as much as about $10°$. The possible transverse offsetting is, for its part, of the order of a few millimeters.

The invention also has as its object a device for curving a glass sheet, comprising a heating furnace through which passes a conveyor defining a substantially horizontal transporting plane and a taking-over tool for the glass sheet at the exit from its passage on said conveyor, a device for measuring the position of the glass sheet, for example the angle $\alpha$ between the effective direction followed by the glass sheet and the longitudinal axis of the conveyor and/or the transverse offset relative to this longitudinal axis, and means for repositioning said taking-over tool, for example for causing it to rotate through this angle $\alpha$ or causing it to execute a translatory movement.

According to a first form of embodiment of the invention, the taking-over tool is composed of a curving machine comprising a shaping bed, constituted of shaping rods disposed along a path having a curved profile in the direction of travel of the sheets, and equipped with a repositioning device, notably for pivoting and/or translatory movement. This type of machine is described, notably, in French patents 2 242 219, 2 549 465 and 2 604 992. The curving machine is situated directly in the continuation of the conveyor passing through the heating furnace. As the glass sheet continues its advance through this machine, an angular deviation of several degrees at entry to the shaping bed results in a deviation of several centimeters at the exit, which at the limit would render inoperative the tilting devices provided for transferring the glass sheets to a cooling conveyor (see FR-A-2 549 465, EP-A-346 197 and EP-A-346 198) and which above all tends to give a twisted shape to the glass sheet. Now although this type of machine is generally used for shapes that are considered as relatively simple because they are essentially cylindrical, an extreme accuracy of the curvature is nevertheless required, because the product panes are frequently intended for the doors of automobiles and must therefore slide in a slender slot to allow the window winding mechanism to operate.

Since each curving machine corresponds to a given radius of curvature, it is generally arranged for the machine to be moved on a frame mounted on wheels and immobilized by supports on the ground when in the working position. Each curving machine of this type may, therefore, be easily converted into a machine suitable for carrying out this invention by the simple addition of a motor-driven pivoting and possibly translatory mechanism, mounted on the frame or fixed on the ground, and mechanisms for freeing the floor supports. It is also possible to use a revolving bridge equipped with rails, by means of which the curving machine is positioned, remaining fixed relative to a floor which pivots it.

According to a second form of embodiment of the invention, the taking-over tool is constituted of an upper seizing and possibly also shaping element, which we will hereinafter designate by the term "upper curving mold", suspended from a raising and lowering device which is also movable in a horizontal plane, notably by rotation about a vertical axis. In a manner well known in these curving techniques, the upper curving mold will seize the glass sheet brought by the conveyor, to deposit and/or press it onto a lower element, which we will hereinafter designate generally by the term "curving frame". The accuracy of the position of the glass sheet with respect to this upper curving mold conditions the succeeding operations, whether this involves lowering the glass sheet onto a curving frame (in the case of a plane or slightly curved upper curving mold) or pressing the glass sheet, the upper curving mould in this case fulfilling a dual role as a preshaping mold and male press. Contrary to the preceding case, there is certainly no reason to fear that the discrepancies will accumulate progressively as the curving operation advances, but these processes are nevertheless much less tolerant: a sheet placed across the curving frame has every chance of breaking or at least of becoming marked and therefore rejected, whereas in the case of a curving machine having a shaping bed composed of revolving elements, the only risk is that of the curvature obtained not being correct.

As indicated earlier, the upper curving mold is always associated with a curving frame. If the shaping comprises a pressing stage, it is necessary to provide means for centering this curving frame. These means may be similar to those with which the upper curving mold is equipped, or more simply they may be indexing means, adapted for centering the frame relative to the upper curving mold. With advantage, the means described in the patents or patent applications U.S. Pat. No. 4,781,745 and EP-A-398 315 may be used.

The curving device according to this invention comprises a device for measuring the angle $\alpha$, characteristic of the offset between the direction effectively followed by the glass sheet and its set-point direction, the longitudinal axis of the conveyor passing through the heating furnace. This device must be capable of performing a measurement with sufficient speed for the rotation of the taking-over tool to be completed when the glass sheet arrives at the position of this tool. Moreover, it has been shown above that it is important for this measurement to be performed as late as possible.

Several types of measuring device may satisfy these conditions. It is possible, for example, to use video means which, by mathematical morphological analysis, will compare the image of the glass sheet—or of a characteristic part of this sheet, notably a corner—with the memorized image of a correctly positioned glass sheet. These video means are particularly suitable in the case in which the glass sheets have a straight front edge which is not, however, perpendicular to the longitudinal axis of the conveyor, or have a curved, broken or other front edge.

It is also possible to operate by means of several contactless detectors, for example two pneumatic detectors analogous to those described in patent application EP-A-348 286, associated with a time counting device and a computer unit.

BRIEF DESCRIPTION OF THE DRAWINGS

Other details and advantageous characteristics of the invention will become apparent from the description given below with reference to the attached drawings, which show.

DETAILED DESCRIPTION OF THE DRAWINGS

Figure 1A:
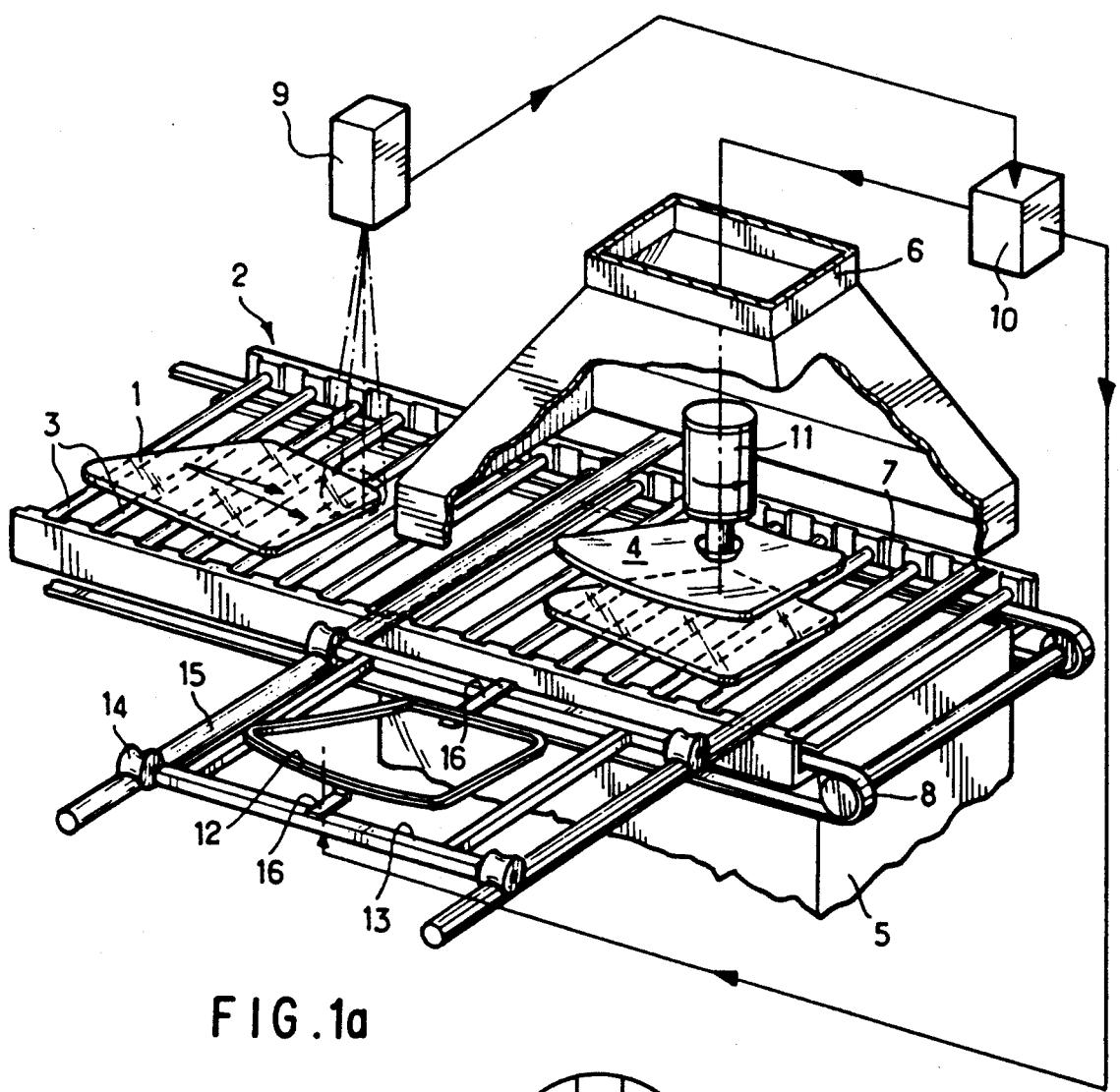
FIG. 1 is a schematic diagram of a curving line, comprising an upper curving mold having its angular position orientated according to the position of the glass sheet to be curved.
Figure 1B:
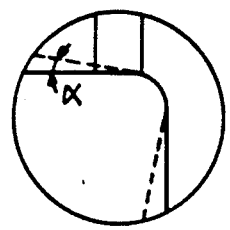

FIG. 1 makes it possible to illustrate the application of the method according to this invention to a horizontal curving line, comprising an upper curving mold which cooperates with a curving frame. Very schematically, the steps of the curving process are as follows: the glass sheet is charged onto a conveyor, which passes through a reheating furnace where the temperature of the glass is raised to the curving temperature and possibly toughening temperature, that is to say to the region of 650°–700° C. and which conveys the sheet beneath an upper curving mold. There, the glass sheet is stopped and is displaced upwards, preferably by a force of a pneumatic nature which presses the glass sheet against said upper curving mold. This upper curving mould is, possibly, curved for preshaping the glass sheets. After the application phase, the glass sheet is released onto a curving frame composed of a ring open at its center, by means of which the glass sheet is shaped to its final form. Carried by the same frame, or after having been transferred onto a special frame, the glass sheet is finally brought into a cooling device, for example of the thermal toughening or quenching type.

In the case shown schematically in FIG. 1, the glass sheet 1, displaced along the line by a conveyor 2 having rollers 3, is brought into contact with the upper curving mold 4 by an ascending hot gas current issuing from the lower duct 5 and escaping through the chimney 6. The details of the curving line and, more specifically, of the hot air circuit are known from the patent EP-169 770.

The invention is, of course, in no way limited to this given type of method and the raising of the glass sheet may also be achieved by means of a suction through the upper mold (EP-3 391) or by a sub-pressure generated at its periphery (EP-210 418 or EP-241 355).

The rollers 3, for example of silica or other material compatible with the curving and toughening temperatures for glass sheets, have a core sleeved onto metal ferrules 7 which, in principle, run without slip on endless belts 8, driven in rotation at the desired movement speed. In the case of wear of certain components, the driving of one roller may be slightly different from that of the other rollers, which results in a slight skewing of the glass sheet if this sheet does not have the axis of the line as its axis of symmetry. Furthermore, these rollers may be faced—at least over their contact area with the glass sheets—with woven or knitted fabrics of refractory fibers intended for preventing pitting of the glass sheet. Here again, a worn facing or one fitted slightly incorrectly may lead to skewing. It is true that it is always possible to monitor the wear of the materials and the correction of interventions, and on the other hand other drive systems for the rollers exist, which are less subject to the problem of wear referred to above, but whatever the precautions adopted, since the first priority is given to the optical quality of the panes, practice shows that all the glass sheets do not follow the nominal trajectory corresponding to a direction of movement indicated by arrow F, which in the case illustrated would signify a front edge moving while remaining rigorously parallel to the axes of rotation of the rollers. At the approach to the shaping zone, the glass sheet is, for example, orientated in a direction defined by the arrow F', corresponding to an angular deviation through an angle $\alpha$, which will certainly vary from one sheet to another. The glass sheet may, moreover, be slightly shifted transversely.

The invention consists, at a first time, of detecting the effective position of the glass sheet, which in the present case is done by a high speed camera 9 mounted above the conveyor. To prevent the highly temperature-sensitive electronic components from being damaged (the camera 9 is disposed in the heating furnace) they are preferably insulated and connected to the optical part by suitable optical fibres. The images are immediately processed by a computer unit 10 which, for example, will operate by comparison with memorized images or by using any other analysis means appropriate for supplying a signal corresponding to this angle $\alpha$ and/or to the transverse shift, it being understood that this analysis must be performed at a sufficiently high speed for the curving tools to be orientated when the glass sheet comes to a stop beneath the upper curving mold. This reorientation cannot, nevertheless, be performed until after the preceding glass body has freed the taking-over tool. In the case of a curving operation with an upper mold, this freeing is achieved when the glass sheet is transferred onto the curving frame; in the case of a curving on a shaping bed, this freeing is achieved as soon as the preceding glass sheet is no longer in contact with the feed conveyor.

The upper curving mold is mounted on a pivoting device 11, which receives a control signal from the computing unit 10 with the result that the upper curving mold 4 rotates so as to be situated exactly vertically above the glass sheet, whatever the angular shift of the latter. It may also be provided with means adapted for providing a translation of the mold, in order to compensate for the transverse shift. If the glass sheet is then simply dropped onto a curving frame without pressing, the orientation alone of the upper curving mold may be sufficient for obtaining a pane of perfect curvature; if, on the other hand, a pressing operation is intended, or if the accuracy demanded requires it, it is possible to provide an orientation of the frame. It is also possible to bring the upper mold systematically back to a reference position corresponding to an exact alignment with respect to the pressing frame.

This frame is composed of a continuous rail 12 carried by a carriage 13, the wheels 14 of which move on rails 15 extending parallel to the rollers 3. The fixing of the frame 12 on the carriage 13 is achieved by means of pins 16. For orientating the frame, these pins 16 are mounted on articulations. In the case illustrated schematically here, one of these articulations is adjusted by a pivot mechanism governed by the computing unit 10. The frame may also be self-centering, that is to say equipped with indexing means cooperating with elements fixed to the curving mold.

After the sheet has been curved, it is conducted to a cooling station, generally of the thermal toughening type, not shown here. The invention assures the production of panes of a particularly high optical quality, because the glass sheet is not subjected to interventions intended for recentering it in the shaping zone. Moreover, since the glass sheet is always well positioned relative to the curving tools, this good optical quality is associated with a good quality of the shaping operation proper, and therefore reproducibility of the shapes produced.

Figure 2:
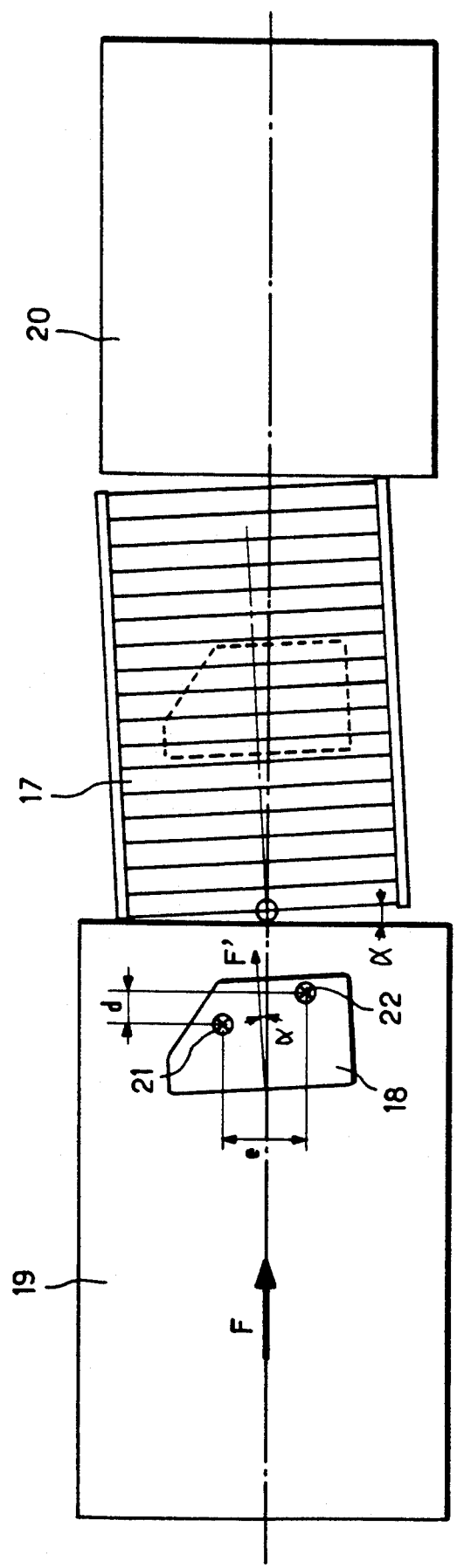
FIG. 2 is a schematic view from above of a curving line, comprising a shaping bed orientated in the axis of the glass sheets to be curved.

FIG. 2 illustrates another form of embodiment of the invention, which in this case is used within the context of a curving line, the curving tool of which is essentially composed of a portion of the conveyor defining a shaping bed curved in the direction of travel of the glass sheet (see, for example, FR-2 442 219, FR-2 549 465). In this case, it is the whole of this portion 17 of the conveyor which will be realigned relative to the direction effectively followed by the glass sheet 18 in proximity to the exit from the furnace 19. This orientation affects, however, only the portion 17 and there is no reason to reorientate the secondary cooling conveyor 20, which in any case receives only glass sheets already toughened, the temperature of which therefore excludes any possibility of further deformation.

It should be noted that, if the shaping is cylindrical, the lateral displacement is not harmful, and therefore only the rotation is necessary for a correct orientation of the curving machine. In the case of FIG. 2, the value of the angle $\alpha$ is not determined by means of a camera but by two contactless detectors 21, 22, for example similar to the pneumatic detectors described in patent application EP-A-348 266. As soon as a first detector "sees" the front edge of the glass sheet moving past at a speed V, measured by a tachometer with which one of the rollers of this detection zone is equipped, it initiates the incrementation of a computer. This incrementation, performed at a counting pitch p of, for example, 5/10 000 of a second, is stopped when the second detector in turn sees the front edge. If P steps have been counted, the distance along the longitudinal axis between the two front edges detected is therefore equal to L=P.p.V. In the case in which the glass body has a straight front edge intended to be parallel to the generatrices of the rollers, this distance may also be expressed as L=d+e tan $\alpha$, where $\alpha$ is the angle which the front edge makes with a generatrix of a roller, e is the distance along the transverse axis between the two detectors, and d is the distance along the longitudinal axis between the two detectors. The value of the angle $\alpha$ is therefore given by the calculation:

$$\alpha = \tan^{-1}\frac{L-d}{e} = \tan^{-1}\frac{P \cdot p \cdot V - d}{e}$$

The curving machine must therefore be rotated through the value of this angle if L is greater than d and in the opposite direction in the contrary case.

Figure 3:
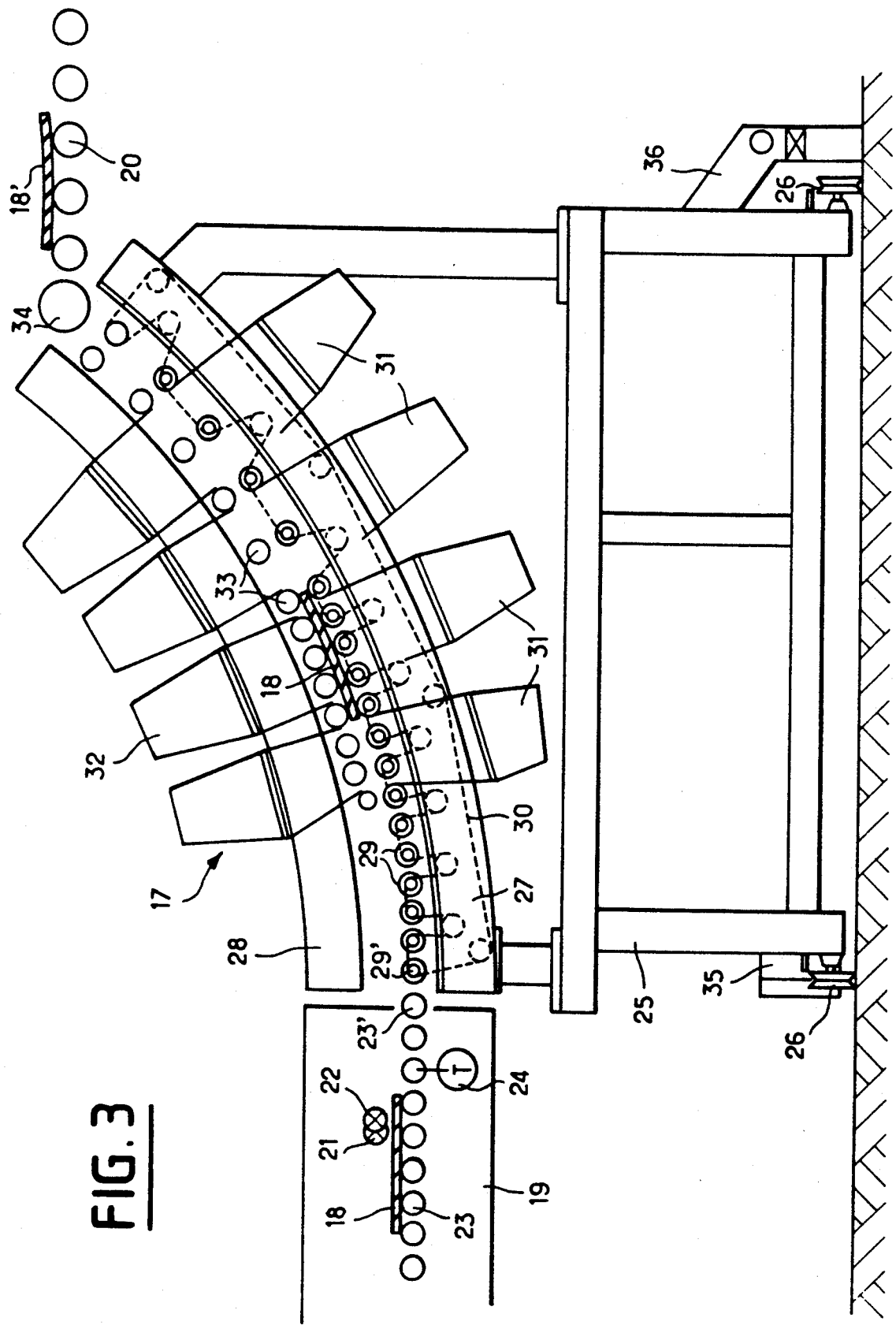
FIG. 3 is a schematic side view of the curving line corresponding to FIG. 2.

The method of orientating the machine can be more especially seen from FIG. 3, where the machine is shown schematically from the side. In this Figure, reference 19 again indicates the reheating furnace, through which a roller conveyor 23 passes. The glass sheet 18 is detected by the detectors 21 and 22, and the speed of the conveyor is measured by the tachometer 24. The curving machine corresponding to the movable portion 17 is entirely mounted on a frame 25 displaceable by means of wheels 26. This frame 25 carries two curved members 27 and 28 curved in a circular arc, which define a curvilinear track, the curvature of which the glass sheet 18 follows. The lower curved member 27 serves as a support for the assembly of lower rollers 29 driven in rotation by a chain 30. In the case shown, the first roller 29' is exactly aligned with the last roller 23' of the furnace 19, and the entry of the glass sheet 18 into the curving machine 17 is thus performed without any shock. The curving zone proper corresponds to the first seven rollers. Beyond this, the glass sheet penetrates into the toughening zone provided with four lower chests 31 and four upper chests 32. In this toughening zone, the advance of the glass is assisted by upper holding elements 33. After the toughening zone, the curved and toughened glass sheets 18' are taken over by a tilting device 34, which deposits them on the secondary cooling conveyor 20.

The orientation of the machine to the angle $\alpha$ measured by the detectors 21, 22 and the computing unit is achieved by means of a pivoting mechanism 35, with which is associated a drive mechanism 36 for the pivoting. In the case shown here, the pivoting mechanism 35 is mounted on the frame 25, but it may also be seated on the floor. However, the frame-mounted solution will be systematically chosen when translation is intended. Furthermore, the pivoting mechanism 35 and drive mechanism 36 also operate blocking and release means for the floor supports of the curving machine.

We claim:

1. Method of curving a glass sheet, comprising the steps of:
   bringing the glass sheet through a reheating furnace by a conveyor defining a substantially horizontal transportation plane;
   detecting an effective position of the glass sheet;
   positioning a taking-over tool as a function of said effective position; and
   subsequently taking over the glass sheet by the curving tool to curve the glass sheet.

2. Method of curving according to claim 1, wherein said detecting step comprises measuring the angle $\alpha$ of deviation between an effective direction followed by the glass sheet before said taking-over step and the longitudinal axis of the conveyor, and wherein said repositioning step comprises rotating said curving tool through the angle α in such a way as to center the tool with respect to the glass sheet.

3. Method of curving according to claim 1 or 2, wherein said detecting step further comprises measuring a transverse offset relative to the longitudinal axis of the conveyor, and wherein said repositioning step further comprises translating said taking-over tool in accordance with the offset.

4. Method of curving according to claim 1 wherein said curving tool comprising an upper curving mold, including the step of repositioning the upper curving mold to a reference position followed by a step of transferring the glass sheet onto a curving frame.

5. Method of curving according to claim 1 including the steps of centering a curving frame to a position of the glass sheet taken over by the curving tool, and transferring the glass sheet from the curving tool to the centered curving frame.

6. Method of curving according to claim 5, including the step of indexing the curving frame onto the curving tool.

7. Method of curving according to claim 1 wherein said detecting step comprises detecting the glass sheet by optical means which provide an image of the glass sheet.

8. Method of curving according to claim 1 wherein said detecting step comprises detecting the glass sheet by means of a plurality of contactless detectors.

9. Device for curving a glass sheet, comprising:
a reheating furnace;
a conveyor passing through the furnace and defining a substantially horizontal transportation plane;
a taking-over tool for the glass sheet positioned at an exit of said conveyor;
a device for measuring the effective position of the glass sheet; and
means for positioning said taking-over tool according to the measured position.

10. Curving device according to claim 9, wherein said device for measuring said position of the glass sheet is a camera having an optical part mounted in the furnace above the conveyor and an electronic image analysis part mounted outside the furnace.

11. Curving device according to claim 9, wherein said measuring device comprises a plurality of contactless detectors.

12. Curving device according to one of claims 9 and 11, wherein the taking-over tool for the glass sheet comprises a curving machine comprising a shaping bed comprised of shaping rods disposed along a path having a profile curved in the direction of travel of the sheets.

13. Curving device according to claim 12 wherein said curving machine is mounted on a frame.

14. Curving device according to claim 13, wherein said positioning means comprises a pivoting mechanism for rotating said frame.

15. Curving device according to one of claims 9 and 11, wherein the taking-over tool for the glass sheet is an upper curving mold suspended from a raising and lowering device.

16. Curving device according to claim 15, including a curving frame onto which the glass sheet is transferred after having been taken over by the upper curving mold, the frame being equipped with a positioning device for positioning the curving frame.

* * * * *